United States Patent
Schleyer et al.

(10) Patent No.: US 12,283,061 B2
(45) Date of Patent: *Apr. 22, 2025

(54) GANTRY ALIGNMENT OF A MEDICAL SCANNER

(71) Applicant: Siemens Medical Solutions USA, Inc., Malvern, PA (US)

(72) Inventors: Paul Schleyer, Knoxville, TN (US); Deepak Bharkhada, Knoxville, TN (US); Harold E. Rothfuss, Knoxville, TN (US); Mohammadreza Teimoorisichani, Knoxville, TN (US); Dieter Ritter, Fürth (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,005

(22) Filed: Dec. 13, 2023

(65) Prior Publication Data

US 2024/0135557 A1 Apr. 25, 2024

Related U.S. Application Data

(63) Continuation of application No. 17/303,842, filed on Jun. 9, 2021, now Pat. No. 11,880,986.

(51) Int. Cl.
*G06T 7/33* (2017.01)
*G06T 7/00* (2017.01)

(52) U.S. Cl.
CPC .............. *G06T 7/33* (2017.01); *G06T 7/0012* (2013.01); *G06T 2207/10081* (2013.01); *G06T 2207/10088* (2013.01); *G06T 2207/10104* (2013.01)

(58) Field of Classification Search
CPC ................................ G06T 7/33; G06T 7/0012
See application file for complete search history.

(56) References Cited

U.S. PATENT DOCUMENTS

| | | | |
|---|---|---|---|
| 7,368,912 B2 | 5/2008 | Kreibich | |
| 7,626,389 B2 | 12/2009 | Fiedler | |
| 7,768,261 B2 * | 8/2010 | Paul | A61B 6/037 324/309 |
| 9,717,473 B2 * | 8/2017 | Palti | A61B 8/4461 |
| 9,958,559 B1 * | 5/2018 | Feng | G01T 1/2985 |

(Continued)

OTHER PUBLICATIONS

P. Viola and W. M. Wells, "Alignment by maximization of mutual information," Proceedings of IEEE International Conference on Computer Vision, Cambridge, MA, USA, 1995, pp. 16-23.

(Continued)

*Primary Examiner* — Kevin Ky

(57) ABSTRACT

A framework for gantry alignment of a multimodality medical scanner. First image data of a non-radioactive structure is acquired by using intrinsic radiation emitted by scintillator crystals of detectors in a first gantry of the multimodality medical scanner. Second image data of the non-radioactive structure is acquired using a second gantry for another modality of the multimodality medical scanner. Image reconstruction may be performed based on the first and second image data of the non-radioactive structure to generate first and second reconstructed image volumes. A gantry alignment transformation that aligns the first and second reconstructed image volumes may then be determined.

20 Claims, 6 Drawing Sheets

(56) References Cited

U.S. PATENT DOCUMENTS

| | | | |
|---|---|---|---|
| 11,880,986 B2* | 1/2024 | Schleyer | G06T 7/73 |
| 2003/0194050 A1 | 10/2003 | Eberhard | |
| 2006/0204953 A1* | 9/2006 | Ptitsyn | G06T 7/0012 |
| | | | 382/128 |
| 2007/0102641 A1 | 5/2007 | Schmand | |
| 2008/0269594 A1* | 10/2008 | Paul | A61B 6/037 |
| | | | 324/318 |
| 2010/0032575 A1* | 2/2010 | Iagaru | A61B 6/032 |
| | | | 250/362 |
| 2010/0063516 A1 | 3/2010 | Parmer | |
| 2011/0235884 A1* | 9/2011 | Schreibmann | A61B 6/037 |
| | | | 382/131 |
| 2014/0217294 A1 | 8/2014 | Rothfuss et al. | |
| 2014/0316258 A1* | 10/2014 | Hahn | A61B 6/037 |
| | | | 600/425 |
| 2015/0018673 A1* | 1/2015 | Rose | A61B 6/037 |
| | | | 600/427 |
| 2015/0173847 A1* | 6/2015 | Hayashi | A61B 6/582 |
| | | | 600/407 |
| 2018/0005400 A1* | 1/2018 | Jain | G06T 7/30 |
| 2018/0031544 A1* | 2/2018 | Chisholm | G01N 33/6812 |
| 2019/0250285 A1* | 8/2019 | Bouhnik | A61B 6/4057 |
| 2019/0251694 A1* | 8/2019 | Han | G06T 7/11 |
| 2019/0380667 A1* | 12/2019 | Takanezawa | G01R 33/481 |
| 2020/0134885 A1* | 4/2020 | Yang | G06T 7/11 |
| 2021/0019924 A1* | 1/2021 | Moriyasu | A61B 6/4417 |
| 2021/0030269 A1* | 2/2021 | De Sisternes | A61B 3/0025 |
| 2021/0177295 A1* | 6/2021 | Maximo | A61B 5/055 |
| 2022/0022834 A1* | 1/2022 | Nehmeh | A61B 6/54 |
| 2022/0398754 A1* | 12/2022 | Schleyer | G06T 7/73 |
| 2023/0263573 A1* | 8/2023 | Bakhishev | G06T 11/60 |
| | | | 382/128 |
| 2024/0135557 A1* | 4/2024 | Schleyer | G06T 7/0012 |
| 2024/0261250 A1* | 8/2024 | Huang | A61K 31/337 |
| 2024/0358337 A1* | 10/2024 | Vancamberg | G06N 3/08 |
| 2024/0361472 A1* | 10/2024 | Bouhnik | G01T 1/1614 |

OTHER PUBLICATIONS

Rothfuss H, Panin V, Moor A, Young J, Hong I, Michel C, Hamill J, Casey M, LSO background radiation as a transmission source using time of flight, Phys Med Biol. Sep. 21, 2014;59(18):5483-500.

* cited by examiner

402

| Rotation (rad): | | | Translation (mm): | | |
|---|---|---|---|---|---|
| Roll | Yaw | Pitch | X | Y | Z |
| 0.00 | 0.00 | 0.2 | -1.47 | -2.67 | -1.42 |

Residual error, CT-PET 604

| Sphere | X | Y | Z |
|---|---|---|---|
| 1 | 1.01 | -0.71 | 0.30 |
| 2 | -0.78 | -0.18 | -0.05 |
| 3 | 0.50 | -0.03 | 0.41 |
| 4 | 0.86 | 0.91 | 0.04 |
| 5 | -1.59 | 0.01 | -0.70 |
| mean | 0.00 | 0.00 | 0.00 |
| Mean abs | 0.95 | 0.37 | 0.30 |

*Fig. 6b*

GANTRY ALIGNMENT OF A MEDICAL SCANNER

PRIORITY CLAIM

This application is a continuation application of U.S. patent application Ser. No. 17/303,842, filed Jun. 9, 2021, the contents of which are entirely incorporated by reference.

TECHNICAL FIELD

The present disclosure generally relates to image data processing, and more particularly to a framework for gantry alignment of a medical scanner.

BACKGROUND

Multimodality imaging plays an important role in accurately identifying diseased and normal tissues. Multimodality imaging provides combined benefits by fusing images acquired by different modalities. The complementarity between anatomic (e.g., computed tomography (CT) and magnetic resonance (MR) imaging) and molecular (e.g., positron-emission tomography (PET)) imaging modalities, for instance, has led to the widespread use of PET/CT and PET/MR imaging.

Multimodality scanners require a procedure to measure the spatial displacement between images produced by the different modalities (e.g., PET to CT displacement, or PET to MR displacement). This procedure is commonly referred to as "gantry alignment". The standard gantry alignment procedure uses radioactive sources or hot phantoms that facilitate the acquisition of PET emission data to form the PET image. Radioactive sources (e.g. points sources, line sources) are typically positioned in a specific arrangement and imaged using, for example, both PET and CT for a PET/CT scanner, or both PET and MR for a PET/MR scanner.

For a PET/CT scanner, the radioactive source material typically produces sufficient X-ray attenuation to produce a CT image. For a PET/MR scanner, the radioactive source material is typically not visible in MR imaging sequences, so the radioactive sources are traditionally surrounded by an MR-visible material, such as oil, which produces an MR image. The MR-invisible radioactive source material results in a void in the MR images, which is used to identify the location of the sources.

However, such gantry alignment procedure that relies on an external radioactive positron source is typically time consuming, since the source must be maintained and carefully placed in the center of the gantry of the scanner. Additionally, a human needs to handle the source repeatedly, which leads to health and safety risks due to the radioactivity of the source.

SUMMARY

Described herein is a framework for gantry alignment of a multimodality medical scanner. First image data of a non-radioactive structure is acquired by using intrinsic radiation emitted by scintillator crystals of detectors in a first gantry of the multimodality medical scanner. Second image data of the non-radioactive structure is acquired using a second gantry for another modality of the multimodality medical scanner. Image reconstruction may be performed based on the first and second image data of the non-radioactive structure to generate first and second reconstructed image volumes. A gantry alignment transformation that aligns the first and second reconstructed image volumes may then be determined.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

FIG. 6a shows an exemplary gantry alignment transformation; and

FIG. 6b shows the residual error.

DETAILED DESCRIPTION

Figure 1:
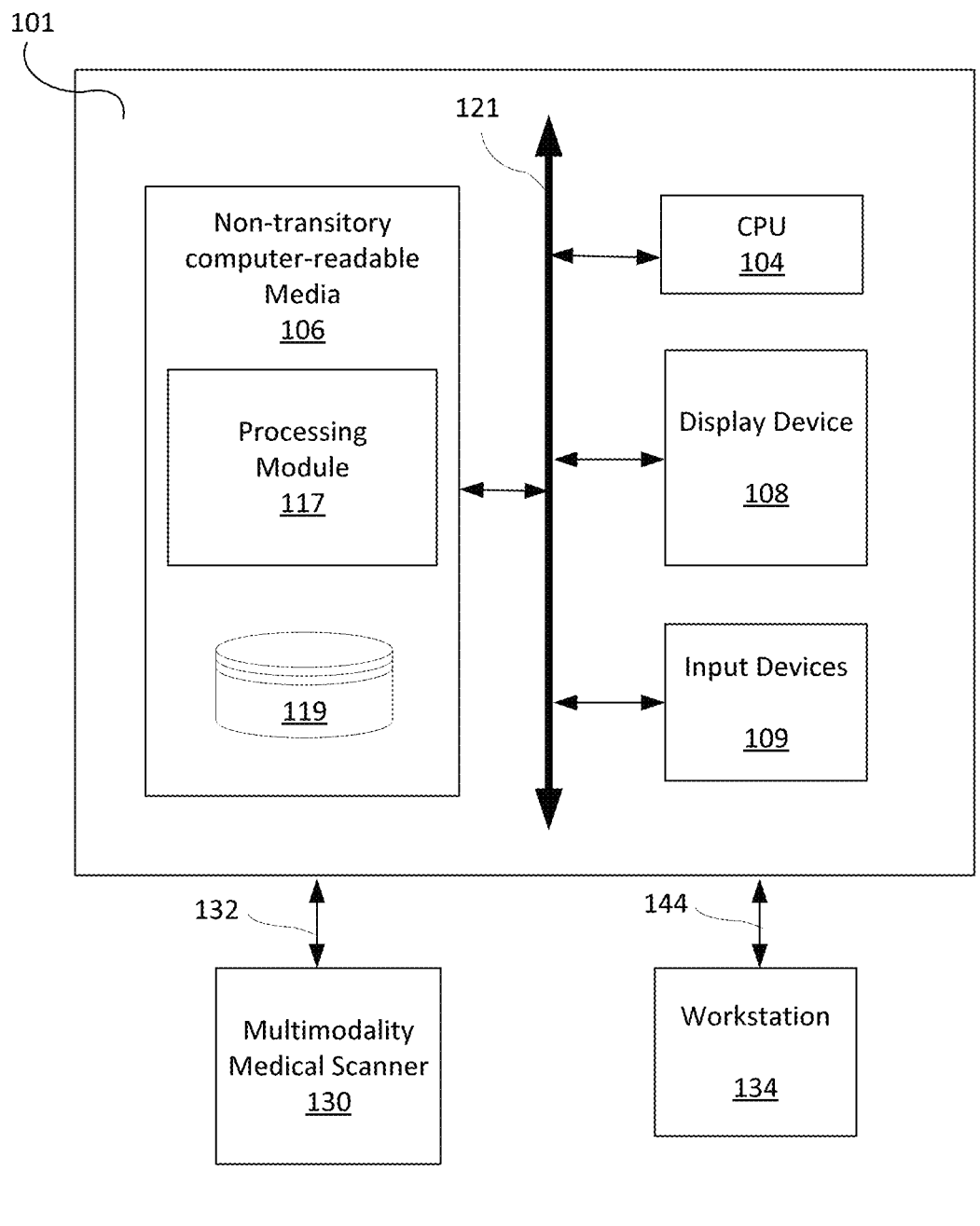
FIG. 1 shows a block diagram illustrating an exemplary system.

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

A framework for gantry alignment is presented herein. In accordance with one aspect, a non-radioactive structure (or phantom) is used for gantry alignment of a multimodality scanner (e.g., PET/CT and PET/MR). Intrinsic radiation from scintillator crystals in the multimodality scanner is used to create transmission images by measuring transmission of photons through a non-radioactive structure. In some implementations, neural networks may be used to determine gantry offsets from the transmission images and/or denoise short-duration scintillator crystals transmission images.

Advantageously, no radioactive sources are required, thereby minimizing ongoing cost to customers to purchase and replace sources. The present framework is more efficient and safer as it does not require a radioactive source to be maintained, and it avoids the health and safety concerns associated with radioactivity. It also advantageously minimizes customer licensing overheads required to store radioactive sources. These and other exemplary advantages and features will be described in more details in the following description.

FIG. 1 is a block diagram illustrating an exemplary system 100. The system 100 includes a computer system 101 for implementing the framework as described herein. In some implementations, computer system 101 operates as a standalone device. In other implementations, computer system 101 may be connected (e.g., using a network) to other machines, such as multimodality medical scanner 130 and workstation 134. In a networked deployment, computer system 101 may operate in the capacity of a server (e.g., in a server-client user network environment, a client user machine in server-client user network environment, or as a peer machine in a peer-to-peer (or distributed) network environment.

In one implementation, computer system 101 includes a processor device or central processing unit (CPU) 104 coupled to one or more non-transitory computer-readable media 106 (e.g., computer storage or memory device), display device 108 (e.g., monitor) and various input devices 109 (e.g., mouse, touchpad or keyboard) via an input-output interface 121. Computer system 101 may further include support circuits such as a cache, a power supply, clock circuits and a communications bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In some implementations, the techniques described herein are implemented as computer-readable program code tangibly embodied in one or more non-transitory computer-readable media 106. In particular, the present techniques may be implemented by a processing module 117. Non-transitory computer-readable media 106 may include random access memory (RAM), read-only memory (ROM), magnetic floppy disk, flash memory, and other types of memories, or a combination thereof. The computer-readable program code is executed by CPU 104 to process data provided by, for example, database 119 and/or multimodality medical scanner 130. As such, the computer system 101 is a general-purpose computer system that becomes a specific-purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein. The same or different computer-readable media 106 may be used for storing a database 119, including, but not limited to, image datasets, a knowledge base, individual subject data, medical records, diagnostic reports (or documents) for subjects, or a combination thereof.

Multimodality medical scanner 130 acquires image data 132 associated with at least one subject. Such image data 132 may be processed and stored in database 119. Multimodality medical scanner 130 may be a radiology scanner (e.g., nuclear medicine scanner) and/or appropriate peripherals (e.g., keyboard and display device) for acquiring, collecting and/or storing such image data 132.

Multimodality medical scanner 130 may be a hybrid modality designed for acquiring image data using at least one modality that uses scintillator crystals for detection (e.g., PET). For example, multimodality medical scanner 130 may include a first gantry for PET imaging and a second gantry for CT or MR imaging. The PET imaging gantry may include a plurality of detectors comprising scintillator crystals. The scintillator crystals may be lutetium-based scintillator crystals, such as scintillator crystals including lutetium orthosilicate (LSO) or lutetium yttrium orthosilicate (LYSO), that include the radioactive isotope Lu-176. A scintillator (or scintillation crystal) in a PET scanner typically detects one of the gamma photons originating from the annihilation event, and another scintillator crystal detects the other gamma photon. The scintillator crystals are typically part of detectors that are arranged in a circular or cylindrical configuration around the region where the patient lies. When struck with a gamma photon, each scintillator crystal emits a flash of visible light that is converted to electrons by a photomultiplier tube (PMT) or Silicon Photomultiplier (SiPM) of the PET scanner for subsequent electrical processing. Intrinsic radiation emitted from the scintillator crystals is used to acquire a transmission image of a non-radioactive structure. See, for example, Rothfuss H, Panin V, Moor A, Young J, Hong I, Michel C, Hamill J, Casey M, *LSO background radiation as a transmission source using time of flight*, Phys Med Biol. 2014 Sep. 21; 59(18):5483-500, and U.S. Patent Application 20140217294, which are both incorporated herein by reference in their entirety.

The workstation 134 may include a computer and appropriate peripherals, such as a keyboard and display device, and can be operated in conjunction with the entire system 100. For example, the workstation 134 may communicate with multimodality medical scanner 130 so that the medical image data 132 from multimodality medical scanner 130 can be presented or displayed at the workstation 134. The workstation 134 may communicate directly with the computer system 101 to display processed data and/or output results 144. The workstation 134 may include a graphical user interface to receive user input via an input device (e.g., keyboard, mouse, touch screen, voice or video recognition interface, etc.) to manipulate visualization and/or processing of the data.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 2:
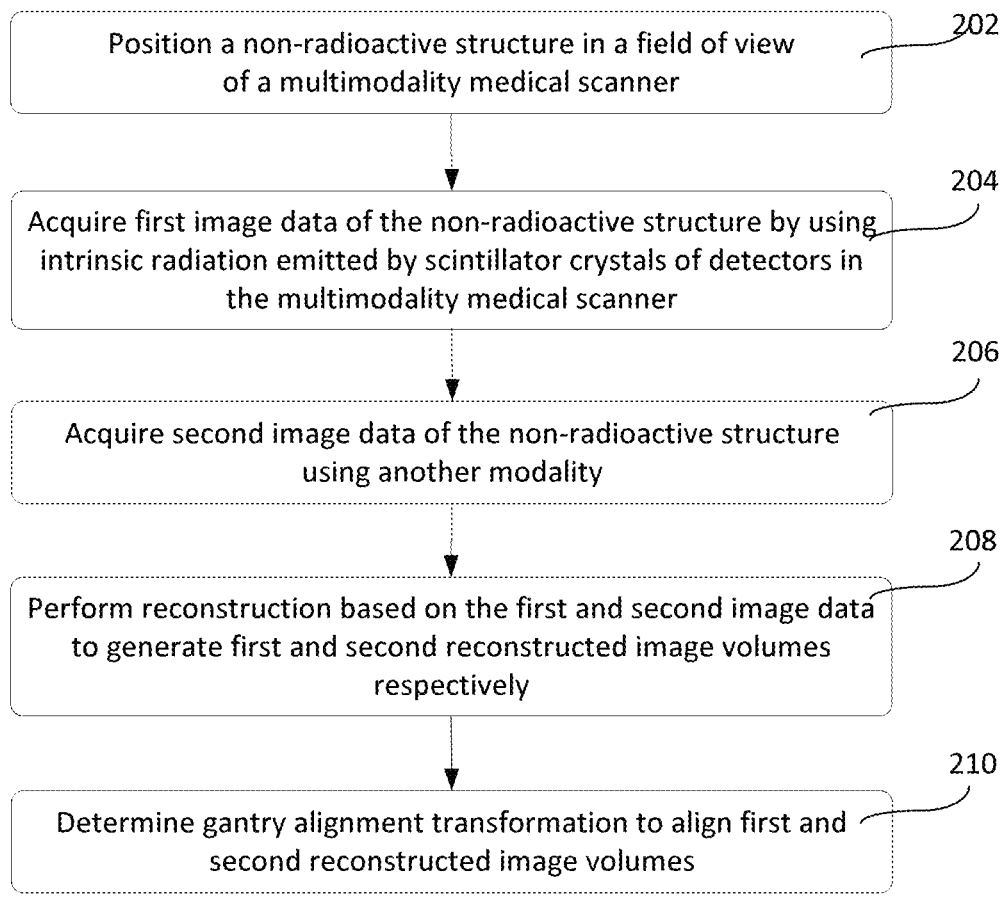
FIG. 2 shows an exemplary method of gantry alignment.

FIG. 2 shows an exemplary method 200 of gantry alignment. It should be understood that the steps of the method 200 may be performed in the order shown or a different order. Additional, different, or fewer steps may also be provided. Further, the method 200 may be implemented with the system 100 of FIG. 1, a different system, or a combination thereof.

Figure 3:
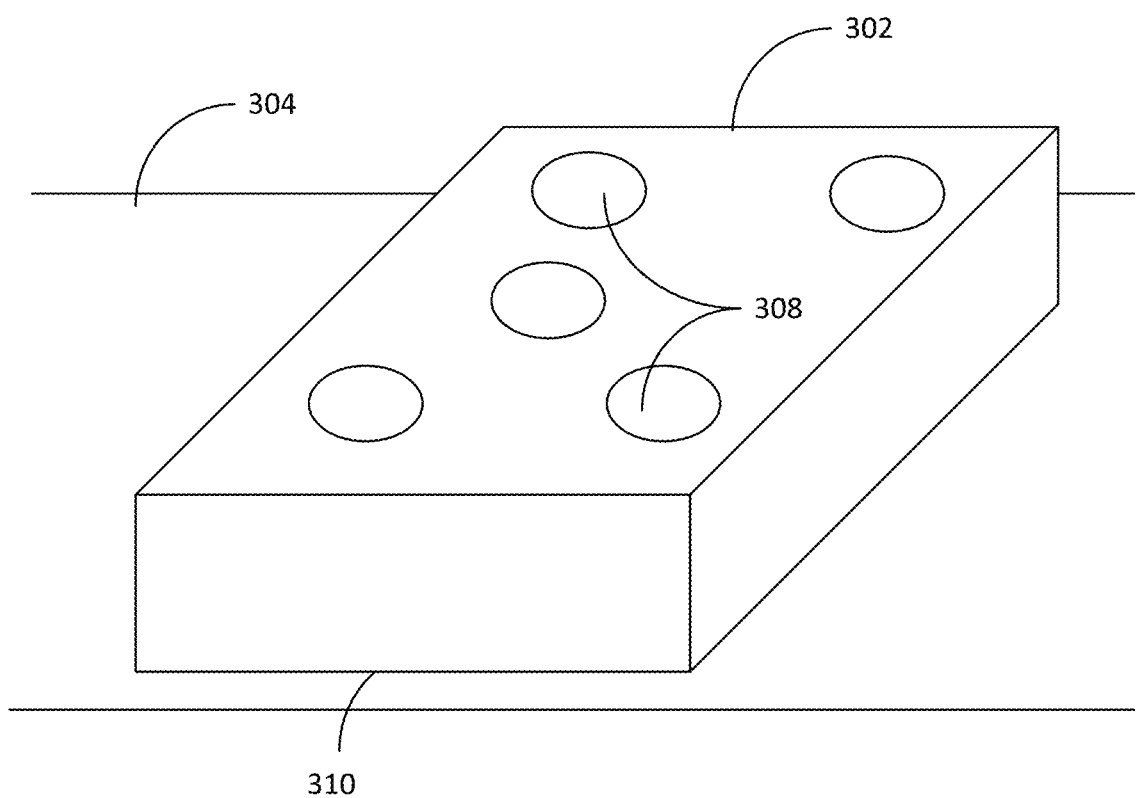
FIG. 3 shows an exemplary non-radioactive structure.

At 202, a non-radioactive structure (or phantom) is positioned in a field-of-view of a multimodality medical scanner 130. FIG. 3 shows an exemplary non-radioactive structure 302. The three-dimensional (3D) non-radioactive structure 302 may be positioned on, for example, a patient table 304 for image acquisition. Alternatively, the non-radioactive structure 302 may be held by a bracket or other support so that it extends into the imaging field-of-view without being located on or above the patient table. In some implementations, the non-radioactive structure 302 includes objects with material and layout that intentionally minimize the overall attenuation of photons emitted from the scintillator crystals. The highly attenuating objects are preferably placed only in locations that contribute constructively to the process which determines the spatial orientation of the structure 302 in the reconstructed transmission image.

For MR imaging, both the composite material and the geometric layout of the phantom structure are selected to consider the uniformity of the MR magnetic field. Spatial distortion in the MR image can result from some materials with high magnetic susceptibilities, and from some asymmetrical geometries. The structure includes objects that substantially attenuate photons from the scintillator crystals and produce an MR image (i.e., MR visible). The objects are distributed or supported by material with low-attenuating properties and that is substantially MR invisible.

The exemplary 3D structure 302 minimizes MR image artefacts, minimizes global photon attenuation, and produces sufficient photon attenuation in desired locations and MR signal to provide both transmission and MR images that can be used to determine spatial offsets between the gantries. The 3D structure 302 includes 3D objects 308 that are constructed from, or filled with, a material that is visible with MR, such as, but not limited to, liquid nickel sulfate (NiSO4). 3D objects 308 may include, for example, spheres or other non-spherical (e.g., cubic) objects. The 3D objects 308 are placed in low density material (e.g., polymer foam) substrate 310. The low density material substrate 310 is substantially invisible in standard MR sequences and minimally attenuates the photons from the scintillator crystals.

For CT imaging, the structure 302 includes objects 308 that attenuate photons from the scintillator crystals and X-rays, and are visible with CT. The objects 308 are distributed or supported in material with low-attenuating properties and result in substantially low Hounsfield United (HU) in the reconstructed CT image. One non-limiting example of such material is liquid nickel sulfate (NiSO4). Other materials may also be used. The 3D objects 308 are placed in low density material (e.g., polymer foam) substrate 310, which results in minimal attenuation of both scintillator photons used to create the transmission image as well as X-ray photons used to create the CT image.

Figure 4:
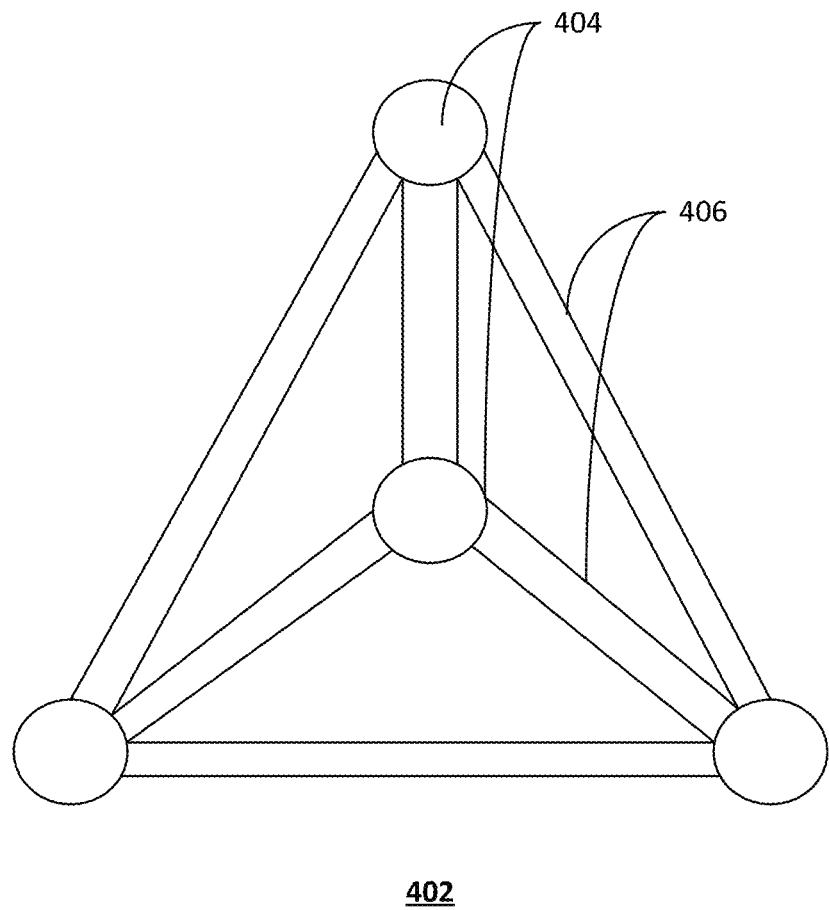
FIG. 4 shows another exemplary non-radioactive structure.

FIG. 4 shows another exemplary non-radioactive structure 402. In this example, NiSO4 filled spheres 404 are connected with rods 406 to form a pyramidal structure. Other types of structures, such as tetrahedral or octahedral structures, are also possible. Rods 406 may be made of polytetrafluoroethylene (PTFE) or any other suitable material. Spheres 404 and rods 406 are visible in transmission and CT images. In MR images, only the spheres 404 are visible, while the PTFE rods 406 do not appear in the images or create any spatial distortion.

Returning to FIG. 2, at 204, first image data of the non-radioactive structure is acquired by using intrinsic radiation emitted by scintillator crystals in the multimodality medical scanner 130. The scintillator crystals may be found in PET detectors of a first gantry in the multimodality medical scanner 130. In some implementations, the scintillator crystals are Lutetium-based scintillator crystals, which are known to have intrinsic radiation that originates from the isotope Lu-176, which is 2.6% abundant in natural occurring lutetium. Lu-176 decay through beta decay with cascading gammas having energies of 307, 202 and 88 keV. The first image data (or transmission data) acquired from the Lu-176 decay may be separated into sinograms depending on the gamma photons' energies. Sinograms may be reconstructed using, for example, the Maximum Likelihood Transmission (ML-TR) algorithm, which is used to reconstruct the transmission image.

At 206, second image data of the non-radioactive structure is acquired by using the second gantry for another modality in the multimodality medical scanner 130. The second modality may be, for example, CT or MR. The non-radioactive structure is preferably not moved between the first and second image data acquisitions. In the case of PET/MR, an MR sequence is either simultaneously, partially simultaneously, or sequentially executed.

At 208, processing module 117 performs reconstruction based on the first and second image data to generate first and second reconstructed image volumes respectively. The first reconstructed image volume may be a volumetric transmission (Tx) image (e.g., LSO-Tx image) that is reconstructed from the first image data using reconstruction methods such as Maximum Likelihood Transmission (ML-TR) image reconstruction technique. The ML-TR image reconstruction technique is an iterative algorithm with quadratic regularization that models the transmission data statistics. See, for example, Rothfuss H, Panin V, Moor A, Young J, Hong I, Michel C, Hamill J, Casey M, *LSO background radiation as a transmission source using time of flight*, Phys Med Biol. 2014 Sep. 21; 59(18):5483-500, which is herein incorporated by reference in its entirety. The first reconstructed image volume (e.g., LSO-Tx image) replaces the acquired and reconstructed PET emission image of radioactive sources typically used in standard gantry alignment procedures.

The second reconstructed image volume may be, for example, a volumetric CT or MR image reconstructed from the second image data using a reconstruction technique such as an iterative reconstruction algorithm, filtered backprojection, statistical modeling or a combination thereof. Other techniques are also useful.

At 210, processing module 117 determines gantry alignment transformation to align first and second reconstructed image volumes. The gantry alignment transformation describes the mechanical displacement (or spatial offset) between the first and second gantries in multimodality medical scanner 130. The gantry alignment transformation identifies one or more rotations and/or translations required to align the first and second reconstructed image volumes. For example, the gantry alignment transformation includes 3 translation values corresponding to the 3 primary orthogonal axes in the image domain (e.g. anterior-posterior, inferior-superior and left-right) and 3 rotational values about these orthogonal axes. Applying the gantry alignment transformation to the first reconstructed image volume (e.g., reconstructed PET images) produces images that are spatially aligned to the second reconstructed image volume (e.g., CT images in the case of PET/CT systems or MR images in the case of PET/MR systems).

In some implementations, analytical methods are used to determine the gantry alignment transformation. One example of an analytical method utilizes affine registration to align the first and second two image volumes using a mutual information-based cost function. See, for example, P. Viola and W. M. Wells, "Alignment by maximization of mutual information," *Proceedings of IEEE International Conference on Computer Vision*, Cambridge, MA, USA, 1995, pp. 16-23, which is herein incorporated by reference in its entirety. Other cost functions are also possible. Another exemplary analytical method explicitly identifies each sphere in the non-radioactive structure in the first and second reconstructed image volumes, and determines the transformation that minimizes the distance between sphere-centers. Sphere centers may be identified by calculating the center of mass of each sphere, or by using prior knowledge of the sphere geometry and locating the spheres using a Hough Transform.

Figure 5:
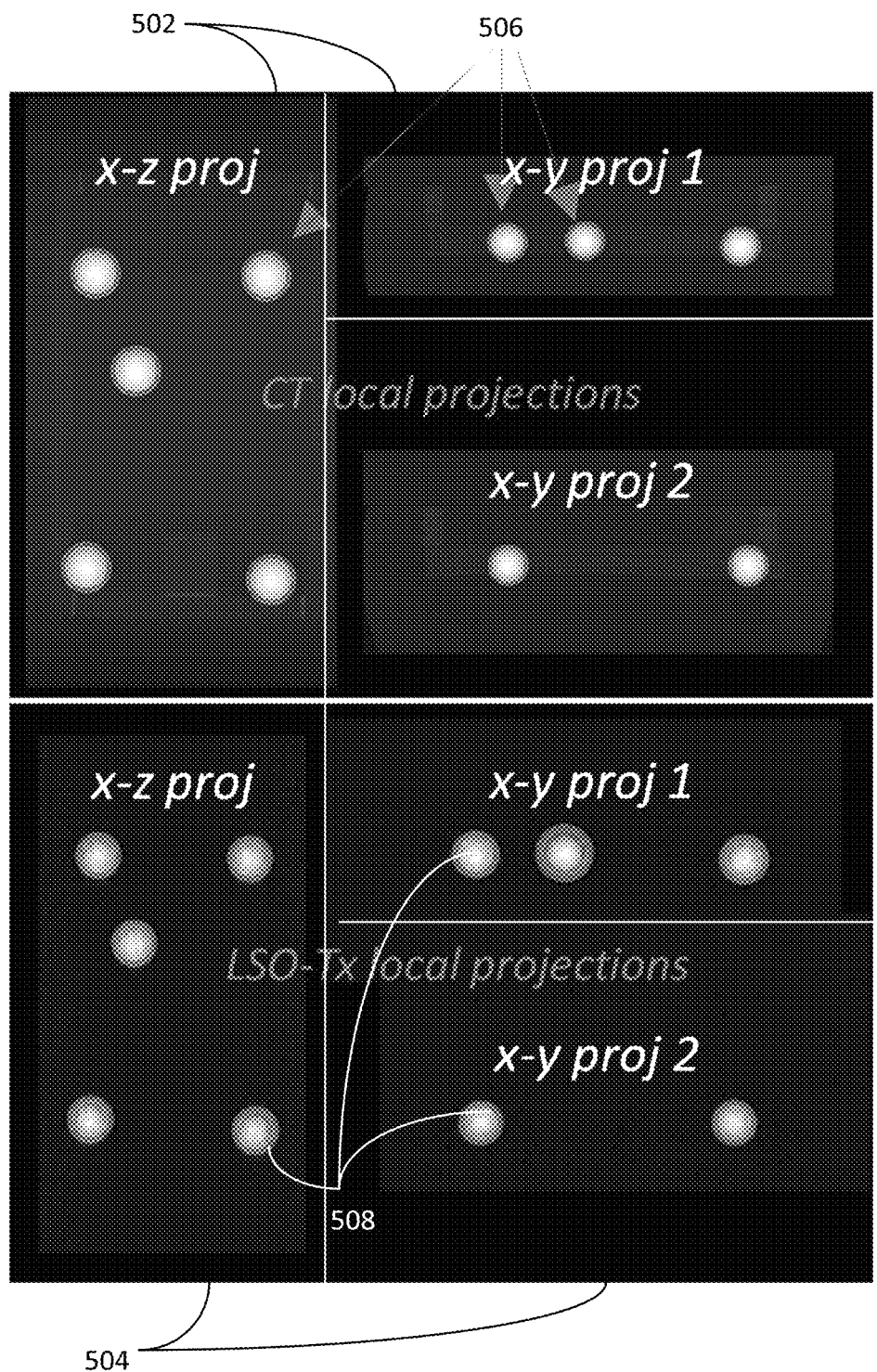
FIG. 5 shows exemplary local projection images.

FIG. 5 shows exemplary local projection images 502 derived from a reconstructed CT image volume (i.e., second reconstructed image volume) and exemplary local projection images 504 derived from a reconstructed LSO-TX image volume (i.e., first reconstructed image volume). The local projection images may be x-z projection images and x-y projection images. Hough Transform may be used to locate the spheres 506 and 508 in the respective projection images 502 and 504. A gantry alignment transformation that minimizes the distance between the centers of spheres 506 and the centers of spheres 508 may then be determined.

In other implementations, analytical methods are used with deep-learning techniques for denoising prior to determining the gantry alignment transformation. Acquisition time for the first image data (i.e., transmission image) of the non-radioactive structure is reduced by denoising. To achieve this, a deep-learning neural network may be trained to approximate a full (or long) duration denoised transmission image (i.e., first image data) from a reduced duration image. Multiple pairs of full-duration and reduced-duration transmission images are used to train the neural network, wherein each reduced-duration transmission image is a subset of the events recorded in the corresponding full-duration transmission image. Alternatively, CT images acquired by a scanner aligned using existing gantry alignment methods may be utilized, only during training, to correlate the LSO TX images to a matching CT dataset and thereby serve as a target for the neural network.

In yet other implementations, deep learning techniques are used without analytical methods to directly determine the gantry alignment transformation. In this approach, transmission images (i.e., first image data) and CT or MR images (i.e., second image data) are acquired and reconstructed, and a deep learning convolutional neural network is used to directly identify the translations and/or rotations that describe the spatial offset between the two gantries of multimodality medical scanner 130. The neural network may be trained with multiple instances of matching first and second reconstructed image volumes (e.g., transmission and CT or MR reconstructed image pairs) on systems with known gantry offsets. The known gantry offset may be obtained by using radioactive marker (or hot phantom) as described in the standard National Electrical Manufacturers Association (NEMA) gantry offset procedure.

FIG. 6a shows an exemplary gantry alignment transformation 602 for a CT-PET medical scanner, as determined by the present framework. As shown, the gantry alignment transformation 602 specifies a rotation (i.e., roll, yaw, pitch) and translation about X, Y and Z axes. FIG. 6b shows the residual error 604 in the resultant gantry alignment transformation. The residual error is determined for each of the 5 spheres in the non-radioactive structure. It can be observed that the mean residual error is 0.00 for all three axes. The mean absolute (abs) error is 0.95 mm, 0.37 mm and 0.30 mm for the X, Y and Z axes respectively.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. A gantry alignment system, comprising:
a non-radioactive structure positioned in a field-of-view of a multimodality medical scanner;
a non-transitory memory device for storing computer readable program code; and
a processor device in communication with the non-transitory memory device, the processor device being operative with the computer readable program code to perform steps including
acquiring first image data of the non-radioactive structure by using intrinsic radiation emitted by scintillator crystals of detectors of a first modality in the multimodality medical scanner,
acquiring second image data of the non-radioactive structure by using a second modality of the multimodality medical scanner,
performing image reconstruction based on the first and second image data of the non-radioactive structure to generate first and second reconstructed image volumes, and
determining a gantry alignment transformation based on the first and second image data by aligning the first and second reconstructed image volumes.

2. The gantry alignment system of claim 1 wherein the scintillator crystals comprise lutetium-based scintillator crystals.

3. The gantry alignment system of claim 2 wherein the lutetium-based scintillator crystals comprise lutetium orthosilicate (LSO) or lutetium yttrium orthosilicate (LYSO).

4. The gantry alignment system of claim 1 wherein the non-radioactive structure comprises objects constructed from or filled with a material that substantially attenuates photons from the scintillator crystals and produces a magnetic resonance (MR) or computed tomography (CT) signal.

5. The gantry alignment system of claim 4 wherein the material comprises nickel sulfate.

6. The gantry alignment system of claim 4 wherein the objects are placed in a substrate that is invisible in MR or CT.

7. The gantry alignment system of claim 6 wherein the substrate comprises a polymer substrate.

8. The gantry alignment system of claim 4 wherein the objects comprise spheres connected with at least one rod.

9. The gantry alignment system of claim 8 wherein the at least one rod comprises polytetrafluoroethylene.

10. A gantry alignment method, comprising:
acquiring first image data of a non-radioactive structure by using intrinsic radiation emitted by scintillator crystals of detectors in a first gantry of a multimodality medical scanner;
acquiring second image data of the non-radioactive structure using a second gantry for another modality of the multimodality medical scanner;
performing image reconstruction based on the first and second image data of the non-radioactive structure to generate first and second reconstructed image volumes; and
determining a gantry alignment transformation based on the first and second image data by aligning the first and second reconstructed image volumes.

11. The gantry alignment method of claim 10 wherein acquiring the first image data of the non-radioactive structure comprises using the intrinsic radiation emitted by Lutetium-based scintillator crystals in positron-emission tomography (PET) detectors to generate the first image data.

12. The gantry alignment method of claim 10 wherein acquiring the second image data comprises acquiring a computed tomography (CT) or magnetic resonance (MR) image.

13. The gantry alignment method of claim 10 wherein determining the gantry alignment transformation comprises determining one or more rotations, translations, or a combination thereof.

14. The gantry alignment method of claim 10 wherein determining the gantry alignment transformation comprises determining an affine registration to align the first and second reconstructed image volumes.

15. The gantry alignment method of claim 10 wherein determining the gantry alignment transformation comprises identifying spheres in the non-radioactive structure based on the first and second image data, and determining the gantry alignment transformation that minimizes distance between centers of the spheres.

16. The gantry alignment method of claim 15 wherein identifying the spheres comprises locating the spheres using a Hough Transform.

17. The gantry alignment method of claim 10 wherein acquiring the first image data of the non-radioactive structure comprises acquiring a reduced duration first image data, and approximating a full duration first image data by applying a trained deep-learning neural network to the reduced duration first image data.

18. The gantry alignment method of claim 10 wherein determining the gantry alignment transformation comprises using a deep learning convolutional neural network to identify the gantry alignment transformation.

19. The gantry alignment method of claim 18 further comprises training the deep learning convolutional neural network with multiple instances of matching the first and second image data on systems with known gantry offsets.

20. One or more non-transitory computer-readable media embodying instructions executable by a machine to perform operations for gantry alignment comprising:
acquiring first image data of a non-radioactive structure by using intrinsic radiation emitted by scintillator crystals of detectors in a first gantry of a multimodality medical scanner;
acquiring second image data of the non-radioactive structure using a second gantry for another modality of the multimodality medical scanner;
performing image reconstruction based on the first and second image data of the non-radioactive structure to generate first and second reconstructed image volumes; and
determining a gantry alignment transformation based on the first and second image data by aligning the first and second reconstructed image volumes.

* * * * *